Patented June 23, 1953

2,643,196

UNITED STATES PATENT OFFICE 2,643,196

PROCESS FOR PREPARING PURE CADMIUM RED PIGMENT

Benjamin W. Allan and Frank O. Rummery, Baltimore, Md., assignors to The Glidden Company, Cleveland, Ohio, a corporation of Ohio No Drawing. Application March 11, 1949, Serial No. 81,023

5 Claims. (Cl. 106—301)

This invention relates to pure cadmium sulfoselenide red pigments, and to an improved process for preparing such red pigments.

In preparing cadmium red pigments it is customary to dissolve selenium in an alkali metal or barium sulfide solution, and then to react this selenium-containing solution with a soluble cadmium salt. When the cadmium salt is suitably selected in view of the metal ions present in the sulfide solution, an unextended (i. e., pure) crude pigment may be formed by the reaction. The crude pigment is separated from the balance of the reaction mass, washed and dried, if desired, and then calcined under non-oxidizing conditions. During the calcination the cadmium, sulfur and selenium are induced to unite into a pigmentary product which exhibits the desired shades of red.

During the calcination it is desirable to have present an oxidic cadmium compound, such as cadmium oxide, hydroxide, carbonate, etc., since the presence of such compound has been found to effect a reduction in the amount of selenium which is otherwise copiously volatilized out of the calcination charge. In one proposal of the prior art the oxidic cadmium compound was prepared separately from the crude cadmium sulfoselenide pigment, and was then mixed or blended into the crude pigment before the latter was calcined. The separate preparation of the oxidic cadmium compound in pigmentary grades and states, and the blending thereof with the crude sulfoselenide pigment involves considerable expense in time, labor and equipment, and in addition has not been found to produce as uniform a calcination mixture as is deemed desirable. This invention is directed to the avoidance of the separate preparation of the oxidic cadmium compound and to the avoidance of a separate mixing or blending step. In accordance with the preferred embodiment of this invention, the oxidic cadmium compound is formed in the presence of, and simultaneously with, the crude cadmium sulfoselenide as a result of its coprecipitation therewith from aqueous solutions. By so coprecipitating these desired compounds to produce the desired calcination mixture, intimate dispersion of the oxidic compound throughout the crude cadmium pigment is obtained, and the separate preparation and subsequent intermixing steps of the desired ingredients of the calcination mass are avoided. By calcining such intimate mixture, an improved cadmium pigment is obtained, and losses of selenium are minimized.

Accordingly, it is an object of this invention to coprecipitate an oxidic cadmium compound and a crude cadmium sulfoselenide pigment.

It is a further object to provide an improved cadmium red pigment by calcining a crude red pigment in the presence of an intimately dispersed oxidic cadmium compound, the intimate dispersion being achieved by coprecipitation of the respective components from aqueous solution.

It is yet another object to reduce or avoid selenium losses during the calcination of cadmium red pigments by having an oxidic cadmium compound more intimately dispersed throughout the calcination mass than heretofore.

These and other objects will be perceived from the following description of the invention.

We have found that numerous advantages accrue from calcining a crude cadmium red pigment mass which has had an oxidic cadmium compound coprecipitated with it and hence intimately dispersed through it. Selenium losses during calcination are reduced or substantially eliminated, lower calcining temperatures are possible, and greater uniformity and control of shade from batch to batch are achieved. These advantages spring largely from the intimacy of the mixture and the carefully selected proportions of oxidic cadmium compound to selenium, and are in contrast with results secured when the oxidic compound is prepared separately and then mixed or blended with the crude pigment. We have found that coprecipitation of the oxidic cadmium compound and the cadmium sulfide, preferably in the presence of selenium, produces the necessary intimacy of mixture, and is furthermore a practical, commercial method which may be adapted to the present commercial methods for producing crude cadmium pigments. Coprecipitation eliminates the former need of separately preparing the oxidic compound in a pigmentary quality and state, and avoids the expenses incident to the time, labor and equipment for so preparing and mixing the oxidic cadmium compound with a calcination mass. In view of these numerous advantages of a coprecipitation method, it is apparent that the latter method offers many features and effects which are commercially desirable.

The invention is applicable particularly to the unextended or pure cadmium red pigments. As is well known, such pigments are produced by incorporating a proportion of selenium with a crude cadmium sulfide pigment mass. The selenium may be incorporated in such mass by two alternative methods, one being to dissolve the selenium in an alkali-metal or barium sulfide solution and then to strike this solution with an aqueous solution of a cadmium salt to produce a pure cadmium sulfoselenide precipitate. The other method involves first preparing a pure cadmium sulfide precipitate and subsequently, but prior to calcination, adding thereto and mixing therein the desired quantity of selenium. The present invention may be applied to each of these methods, but for reasons of commercial expediency we particularly prefer the first of said methods; namely, that in which the selenium is dissolved in the aqueous sulfide strike liquor, so that the oxidic compound is coprecipitated with the cadmium sulfide in the presence of selenium.

In accordance with our preferred method of operation, we strike a soluble cadmium salt solution with a previously prepared aqueous alkaline sulfide solution containing selenium and an oxidic compound of an alkali or alkali-earth metal, the latter oxidic compound being chosen in view of the cadmium salt which is being used so that cadmium sulfoselenide and an oxidic cadmium compound are the only insoluble products of the subsequent strike reactions. For example, if a cadmium nitrate solution is to be struck, the sulfide solution may be composed of sodium, potassium or lithium sulfide containing selenium dissolved therein, and either or any of sodium, potassium, lithium or barium hydroxide, or sodium, potassium or lithium carbonate. Barium carbonate or mixtures of oxidic compounds of alkali metal and barium which by metathesis yield barium carbonate cannot be used because barium carbonate is insoluble and hence unable to effect the precipitation of the desired oxidic cadmium compound. When a solution of cadmium sulfate is to be struck to make a pure red pigment, alkali-earth metal ions must be essentially absent in both the sulfide component and the oxidic component since even small amounts of alkali-earth metal ions from such sources or any other sources may produce a precipitation of alkali-earth metal sulfate along with the desired crude cadmium pigment. The following tabulation shows the various oxidic compounds which can be used in the indicated strike systems for producing pure red pigments:

$Cd(NO_3)_2$+alkali metal sulfide solution containing Se:
   (a) $NaOH$, $Na_2CO_3$, $KOH$, $K_2CO_3$, $Li_2CO_3$ or mixtures
   (b) $NaOH$, $KOH$, $LiOH$, $Ba(OH)_2$ $Ca(OH)_2$ or mixtures $Cd(NO_3)_2$+barium sulfide solution containing Se:
   (c) $NaOH$, $KOH$, $LiOH$, $Ba(OH)_2$ $Ca(OH)_2$ or mixtures $CdSO_4$+alkali metal sulfide solution containing Se:
   (d) $NaOH$, $KOH$, $LiOH$, $Na_2CO_3$, $K_2CO_3$, $Li_2CO_3$ or mixtures Typical strike reactions involved in the practice of the invention are:

The portions enclosed in brackets represent a single strike solution, but in the interest of clarity, the portions thereof which are involved in the formation of the oxidic cadmium compound are represented separately from the portions which react with the bulk of the cadmium salt to form cadmium sulfoselenide. In all of the above equations, the selenium may be present in a variable amount; accordingly, the symbol $\overline{Se}$ is used to signify that selenium is present but is not necessarily present in atomic proportions. The above equations illustrate that the various reactants are selected so that cadium sulfoselenide and the oxidic cadmium compounds are the only insoluble products which are formed. The other reaction products, being soluble, can be removed from the precipitates by washing.

During the subsequent calcination of the crude pigment obtained from the strike, other reactions occur between the oxidic cadmium compound, part to all of the selenium and part of the cadmium sulfide to produce the final pigment. Without being restricted to the theory there indicated, we believe that the following reactions are typical:

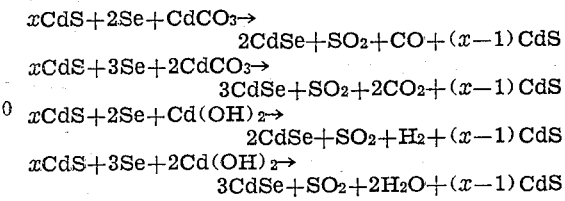

It will be understood that excess selenium over the molar proportions indicated in these reactions may be used. The reactions of other oxidic cadmium compounds, such as cadmium oxalate, cadmium formate, cadmium tartrate, etc., are comparable, and the fundamental consideration common to all is the concept of coprecipitating cadmium sulfide and an oxidic cadmium compound in the presence of selenium, and then calcining the coprecipitate to bring about a reaction between the three components (1) the oxidic cadmium compound, (2) part of the cadmium sulfide, and (3) part to all of the selenium. During the calcination a part of the cadmium sulfide may not enter into the aforementioned reaction directly, as the equations illustrate, but such portions may nevertheless be influenced by the calcination and by the resulting reaction products in such manner that pigmentary and desired color qualities are imparted to the entire calcination charge. The influence of the reaction and/or reaction products on the mass as a whole is manifest in two prominent ways: (1) pigmentary qualities are developed in the mass at lower calcination temperatures than would be needed if the oxidic compound were not coprecipitated with the cadmium sulfide in the presence of selenium, and (2) the selenium is used more efficiently in developing desired color tones and qualities; that is, selenium losses by volatilization are reduced, and deeper colors are obtainable, indicating that the selenium can be

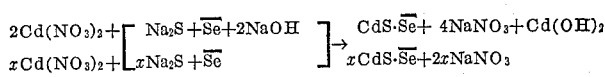

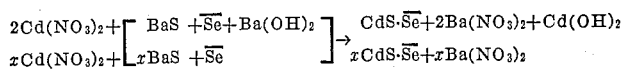

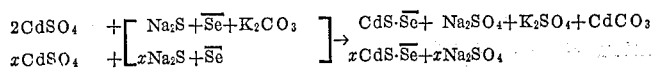

induced to combine with the cadmium sulfide more effectively than in prior art methods.

It has long been known that the red shades of cadmium sulfoselenide pigments are due to some sort of combination between the selenium and the cadmium sulfide. It is yet, so far as we are aware, a matter of speculation whether the combination is strictly chemical, or physical, or physico-chemical, and when we speak of the selenium being combined with the cadmium sulfide, we do not want to be restricted by any theory regarding the manner in which the combination has been effected or exists. For our present purposes of explaining the invention in such manner that one skilled in the art may practise it, selenium may be regarded to be combined with cadmium sulfide when the finished pigment has an orange or red color and can be shown by chemical analysis to contain the three elements cadmium, sulfur, and selenium.

On this basis it will be understood that the foregoing calcination reactions express our theory that at least a part of the selenium is induced to combine with cadmium to form cadmium selenide. The reactions may be written in a simplified form by omitting the cadmium sulfide which does not react directly with selenium and the oxidic cadmium compound:

A. $CdCO_3 + CdS + 2Se \rightarrow 2CdSe + SO_2 + CO$
B. $2CdCO_3 + CdS + 3Se \rightarrow 3CdSe + SO_2 + 2CO_2$ We express no theory as to the way in which the cadmium selenide so formed ultimately combines with any balance of the cadmium sulfide to form a red pigment, nor do we express any theory as to the manner in which any excess selenium may contribute to the final red color. Accordingly we propose that reactions A and B, and others comparable thereto, account in part for the more effective use of selenium which occurs as a result of our intentional incorporation in the calcination charge of a coprecipitated oxidic cadmium compound, by illustrating that under such conditions, at least a part of the selenium is induced to form a cadmium selenide compound, and oxygen derived from the oxidic cadmium compound is united with sulfur derived from the cadmium sulfide to form sulfur dioxide. The proportions represented in Equation A are preferred because they result in the formation of reducing conditions during calcination.

In summary, the invention involves the fundamental steps of (1) coprecipitating cadmium sulfide and an oxidic cadmium compound, preferably in the presence of selenium, thereby producing an intimate mixture of the components, and (2) then calcining the intimate mixture under conditions which convert the coprecipitated mass to a pigmentary state. The improvements which we have observed to flow from these steps are:

1. A more effective use of the selenium—
    a. Reduced losses of selenium.
    b. Deeper colors for given ratios of selenium to sulfur in the uncalcined pigment.
2. Lower calcination temperatures.
3. Avoidance of the costs heretofore involved in—
    a. Separately preparing the oxidic cadmium compound.
    b. Subsequently mixing the said oxidic compound into a crude cadmium sulfide-selenium mass for calcination therewith.
4. Cleaner and brighter colors.

In practising the invention, one must keep in mind that the shade of red in the finished pigment is determined largely by the ratio of selenium to cadmium sulfide. Low ratios (i. e., low selenium content) produce the orange colors and light reds, while high ratios (high selenium content) produce the maroons and deeper shades. Because of the effective manner in which the present invention utilizes the selenium, prior art ratios can be followed only roughly, and a person skilled in the art who seeks to produce a particular shade of red will realize that he must conduct a few trials to determine the precise ratio which he should use to produce the particular shade desired. Preferably, however, the molar ratio of selenium to cadmium sulfide should be less than about 3:1.

The subsequent examples give the proportions which we employ for a light red, a medium red and a very deep maroon. These examples may serve as guides to one who desires intermediate shades, provided he employs the same molar ratios of selenium to oxidic cadmium compound. It will be understood from Equations A and B above that it is this latter ratio which promotes the effective use of the selenium. The higher the ratio is, the more nearly one approaches the prior art and the less efficiently is the selenium used. However, the oxidic cadmium compound should not be less than about ½% by weight of the crude pigment. When the oxidic cadmium compound is proportioned approximately stoichiometrically to the total selenium, on the basis of Equations A or B, the selenium is employed very effectively. We accordingly prefer to use Se : CdO ratios of between 3:2 and 2:1.

After one has selected the approximate ratio of selenium to cadmium sulfide, on the basis of the shade of red he desires, and has also selected the desired proportion of oxidic cadmium compound, on the basis of Equations A or B, or otherwise, he is ready to formulate the strike solutions which will yield the desired crude pigment mass. One strike solution is prepared to contain the total quantity of cadmium desired in the crude pigment. Any soluble cadmium compound can be used in preparing this solution and the specific gravity of the solution may be varied widely. However, a moderately concentrated solution is preferable to avoid the handling of large volumes of solution. The other strike solution is formulated with a soluble sulfide, selected as indicated above in view of the soluble cadmium compound being employed, and is made up to contain enough combined sulfur and dissolved selenium to give the ratios of selenium and sulfur to cadmium oxide which are desired in the crude coprecipitated pigment mass. The alkaline-reacting oxidic compound which by reaction with part of the cadmium salt solution produces the desired oxidic cadmium precipitate is also included in this strike solution, after which the solution is farther adjusted, if necessary, with water additions to bring it to any convenient specific gravity.

From what has just been described, it will be understood that four strike components are involved, one being the soluble cadmium salt which is prepared as a first strike solution, the other three being selenium, an alkaline-reacting oxidic component and a soluble sulfide, being combined into a second strike solution.

The two strike solutions may be reacted in any desired sequence, as cadmium first, cadmium second, simultaneously, or otherwise. We particularly prefer a simultaneous strike in which the two solutions are poured together at a slow controlled rate and are mixed with good agitation. This type of strike is particularly effective in giving accurate control of the particle size of the crude pigment mass. The strikes may be carried out at room temperatures or in a heated condition but we prefer to avoid temperatures in the strike slurry above about 70° C. Warm to hot strikes are beneficial to pigment qualities when light reds or orange pigments are being prepared, while cold or room temperature strikes are advantageous to the deeper shades. The strikes should preferably be conducted so as to maintain a pH in the strike slurry of between about 7.0 and 10.0 and we particularly prefer a pH between about 9.0 and 9.5.

After the strike has been completed, the strike slurry is filtered and the crude coprecipitated pigment mass is washed to remove soluble salts. Any conditioning agent(s) which may be desired to assist the development of pigmentary qualities during the calcination may then be added to the pigment mass in any convenient manner, such as by repulping the filter cake and adding the conditioning agent(s). The crude conditioned pigment mass may then be dried and ground preparatory to calcining it.

The crude pigment may be calcined in any suitable furnace at temperatures between about 400° C. and 700° C. During calcination a non-oxidizing atmosphere is desirable, and it may be either substantially neutral or mildly reducing. Strongly reducing atmospheres should, however, be avoided as they may interfere with the desired elimination of sulfur which is accomplished in our process by reaction of cadmium sulfide with the oxidic cadmium compound. The non-oxidizing atmosphere may be supplied from external sources, or may be generated in situ, as when the proportions of the crude pigment correspond to those of Equation A above. When the pigment has been suitably calcined, it may be quenched in water directly from the calcining chamber. The quenched pigment may then be filtered, dried, and ground.

We have found that pure red pigment prepared in accordance with this invention has high tinting strength, good texture, gloss and grinding properties and possesses clean, bright color qualities.

The following examples illustrate the invention, but it will be understood that many departures may be made from the examples in accordance with the principles stated hereinabove.

*Example 1.—Light red pigment*

The precipittaion reaction is as follows:

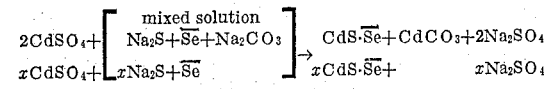

The calcination reaction which is desired is as follows:

(CdS) +CdS+2Se+CdCO₃→
2CdSe+SO₂+CO+(CdS)

The CdS enclosed within parentheses indicates the large excess of CdS which is present beyond the direct requirements of the reaction.

Flake sodium sulfide was dissolved and filtered to remove impurities. A typical solution resulted which contained sulfide ions equal to 32.2 g./l.

To 55.5 gallons of this solution were added 11.4 pounds of Na₂CO₃ and 9.7 pounds of Se.

This mixed solution, and 40.0 gallons of a pure solution of CdSO₄ which contained 177.3 g./l. Cd, were added simultaneously to 10 gallons of water at 60° C., and the above mentioned solutions were added at such rates that the pH+ value of the slurry was maintained at 9.0 to 9.5. There was formed a raw pigment which contained 67.3 pounds of CdS, 10.6 pounds of CdCO₃, and 9.7 pounds of Se.

The precipitate was filtered and washed to remove soluble salts and then was dried at below 100° C., and crushed in preparation for calcination.

The crushed raw pigment was calcined at temperatures between 400° C. and 700° C. in its own atmosphere and quenched in water. There was very little loss of selenium by volatilization during the calcination.

The produce had excellent tinting strength and color quality, and good grinding properties in oil and enamel vehicles.

*Example 2.—Medium red pigment*

In this instance the following reaction was employed to effect the precipitation:

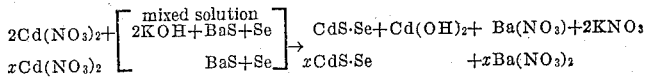

A warm, filtered solution of BaS was prepared which contained 27.4 g./l. sulfide ion. 69.4 gallons of the barium sulfide solution were treated with 10.4 pounds of KOH and 18.3 pounds of granular selenium. When this solution was added to 41.3 gallons of a pure solution of Cd(NO₃)₂ containing 177.3 g./l. Cd, a precipitate was formed which contained 1 mole of Cd(OH)₂ per 4 moles of Se.

The precipitate was formed by adding the mixed solution composed of BaS, KOH and Se at 70° C., to the solution of Cd(NO₃)₂, at 25° C., slowly, with rapid agitation. The only heat introduced into the reaction came by way of the heated barium liquor and the heat of the reaction itself. The final pH+ of the slurry was 8.0. The precipitated raw pigment was filtered and washed to remove soluble salts. The precipitate was then dried rapidly at 90° C. in an oven, and crushed in preparation for calcination.

The raw pigment was calcined in a gas-fired rotary kiln, in a non-oxidizing atmosphere at temperatures between 400° C. and 700° C., quenched in water, and washed.

The resulting pigment was of high tinting strength, soft, with good texture, good gloss, and good grinding properties.

In this instance the loss of selenium during the calcination was slightly greater than in Example 1, but not excessive.

*Example 3.—Very deep maroon pigment*

The lowest molar ratio of Se to CdO consistent with the preferred conduct of the invention was utilized in the instant example to minimize the volatilization of Se during the calcination, i. e., 3 moles of selenium to 2 moles of cadmium hydroxide.

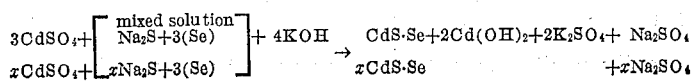

A volume of 38.0 gallons of a purified solution of sodium sulfide which contained 36.1 g./l. sulfide ion, was treated with 23.4 pounds of KOH and 21.5 pounds of granular Se.

A solution of pure cadmium sulfate was prepared which contained 174.4 g./l. Cd. The pH+ of the solution was 5.7. 41.6 gallons of this solution were used for the precipitation of the raw pigment.

The precipitation was made in the cold under constant agitation. The above solutions were added simultaneously to 10 gallons of water so that the pH value was maintained in the range 9.0 to 9.5 throughout the entire 100-minute precipitation. No external heat was introduced into the reaction. The final pH+ value was 9.2. The precipitate contained 51.75 pounds of CdS, 26.5 pounds of Cd(OH)$_2$, and 21.5 pounds of Se.

The precipitate was washed, dried rapidly below 90° C., and crushed in preparation for calcination.

Calcinations in the range 400°–700° C. in a non-oxidizing atmosphere produced pigments of excellent tinting strength and color.

Paint grinds were easily prepared and resulted in products of high gloss and good texture.

In the foregoing examples, a small excess of the oxidic alkaline-reacting compound has been used over that amount needed to precipitate the desired quantity of oxidic cadmium compound. This is desirable practice, and is especially desirable when the cadmium sulfate solution contains nitrates as a result of the use of nitric acid or ammonium nitrate during the dissolution of the cadmium metal. The excess alkaline-reacting compound aids in neutralizing the acidity which is caused by such nitrates.

We have pointed out above that while we prefer to incorporate selenium in the crude pigment mass by dissolving it in the soluble sulfide solution, it is also practicable to omit the selenium during the coprecipitation, and to add it to the crude pigment mass at a later state prior to calcination. Such subsequent addition of selenium usually involves an extended grinding operation which introduces extra costs and when conducted on a commercial scale usually fails to give as intimate a mixture as can be secured by coprecipitating the oxidic cadmium compound and the cadmium sulfide in the presence of selenium which has been dissolved in the sulfide strike solution. For these reasons we have exemplified the latter process as being the best mode of applying the principles of our invention.

It will be understood that numerous other variations of the process are possible within the scope of the following claims without departing from the principles of our invention.

Having now described our invention, what we claim is:

1. The method of making a cadmium sulfoselenide pigment, which method comprises: calcining in a non-oxidizing atmosphere at temperatures between about 400° C. and 700° C., an intimately mixed crude pigment mass composed essentially of cadmium sulfide, and insoluble oxidic cadmium compound and selenium, the oxidic cadmium compound being present in sufficient quantity to provide at least ½% of cadmium oxide by weight of the crude pigment mass, the selenium being present in sufficient quantity to provide a molar ratio of selenium to cadmium oxide of at least 3 to 2, and the cadmium sulfide being present in sufficient quantity above a molar ratio of CdS : Se of 1 to 3 to produce the desired shade of red, at least the cadmium sulfide and the oxidic cadmium compound in said mass having been formed in situ and coprecipitated as the direct insoluble products of a single strike between: (a) an aqueous solution of a cadmium salt as one strike component, and (b) a mixed aqueous solution as the other strike component, said mixed solution containing a soluble oxidic alkaline-reacting compound whose anion forms with cadmium ions an insoluble oxidic cadmium compound, and a soluble sulfide whose cations yield water-soluble compounds when combined with the anion of said cadmium salt.

2. The method as claimed in claim 1 wherein the selenium is incorporated in said coprecipitated mass by dissolving it in the said mixed aqueous solution prior to the said strike.

3. The method as claimed in claim 1 wherein the selenium is incorporated in the crude pigment mass by intimately dispersing it into the coprecipitated mixture of cadmium sulfide and oxidic cadmium compound after said coprecipitated mixture has been formed.

4. The method of making a cadmium sulfoselenide pigment which comprises the steps of: providing a coprecipitated crude pigment mass composed essentially of cadmium sulfide, an insoluble oxidic cadmium compound and selenium, the oxidic cadmium compound being present in sufficient quantity to provide at least ½% of cadmium oxide by weight of the crude pigment mass, the selenium being present in sufficient quantity to provide a molar ratio of selenium to cadmium oxide of at least 3 to 2, and cadmium sulfide being present in sufficient quantity above a molar ratio between CdS and Se of 1:2 to produce the desired shade of red in the finished pigment, said coprecipitated mass being formed in situ as the direct insoluble products of a single strike between (a) an aqueous solution of a cadmium salt as one strike component, and (b) a mixed aqueous solution as the other strike component, said mixed solution being composed of a soluble oxidic alkaline-reacting compound whose anion forms with cadmium ions and insoluble oxidic cadmium compound, a soluble alkaline sulfide, and dissolved selenium, and being substantially free of cations which yield insoluble salts when combined with the anion of said cadmium salt; and calcining said crude pigment mass in a non-oxidizing atmosphere at temperatures between about 400° C. and 700° C. until converted to pigment.

5. The method as claimed in claim 4 wherein the molar ratio of selenium to cadmium oxide is between about 3:2 and 2:1.

BENJAMIN W. ALLAN.
FRANK O. RUMMERY.

References Cited in the file of this patent
UNITED STATES PATENTS

| Number | Name | Date |
| --- | --- | --- |
| 2,134,055 | Meister | Oct. 25, 1938 |
| 2,148,194 | Drucker | Feb. 21, 1939 |
| 2,248,408 | Juredine | July 8, 1941 |